United States Patent
Albertson et al.

[15] 3,678,056
[45] July 18, 1972

[54] PROCESS FOR THE PREPARATION OF 1,2,3,4,5,6-HEXAHYDRO-2,6-METHANO-3-BENZAZOCINES

[72] Inventors: Noel F. Albertson, East Greenbush; William F. Wetterau, Albany, both of N.Y.

[73] Assignee: Sterling Drug Inc., New York, N.Y.

[22] Filed: July 2, 1970

[21] Appl. No.: 52,092

Related U.S. Application Data

[62] Division of Ser. No. 670,391, Sept. 25, 1967, Pat. No. 3,585,203.

[52] U.S. Cl. ............... 260/293.52, 260/290 H, 260/293.54, 424/267
[51] Int. Cl. ........................................... C07d 39/00
[58] Field of Search ............... 260/293 A, 293.2, 294.7 B, 260/DIG. 13

[56] References Cited

UNITED STATES PATENTS

| | | |
|---|---|---|
| 3,341,538 | 9/1967 | Block et al. ..................... 260/247.2 |
| 3,320,265 | 5/1967 | Clarke ............................ 260/294.7 |
| 3,138,603 | 6/1964 | May .............................. 260/294.3 |
| 3,417,094 | 12/1968 | Dexter .......................... 260/294.7 |
| 3,476,757 | 11/1969 | Cross ............................ 260/268 |

OTHER PUBLICATIONS

Dahn et al., Helv. Chim. Acta 35, 1162– 1168 (1952).
Hartung et al., " Organic Reactions," Volume VII (Adams et al., editors), John Wiley & Sons, Inc., New York, pp. 263– 266, 275– 278 (1953).

Primary Examiner—Henry R. Jiles
Assistant Examiner—G. Thomas Todd
Attorney—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT

Process, and intermediates useful therein, for obtaining certain 1,2,3,4,5,6-hexahydro-8-(H or OH)-2,6-methano-3-benzazocines valuable as pharmaceutical intermediates by catalytic hydrogenolysis of the corresponding N-benzyl compounds, the latter being produced by Grignard reaction of a benzylmagnesium halide with an N-benzyl-pyridinium halide to yield an N-benzyl-2-benzyl-1,2-dihydropyridine, reducing this to the corresponding tetrahydropyridine, and cyclizing this product by heating with a strong mineral acid to obtain the 1,2,3,4,5,6-hexahydro-3-benzyl-8-(H or OH)-2,6-methano-3-benzazocine.

4 Claims, No Drawings

PROCESS FOR THE PREPARATION OF 1,2,3,4,5,6-HEXAHYDRO-2,6-METHANO-3-BENZAZOCINES

This application is a division of our prior copending application Ser. No. 670,391, filed Sept. 25, 1967 now U.S. Pat. No. 3,585,203.

This invention relates to chemical processes and chemical compounds.

The invention sought to be patented, in a process aspect, resides in a novel process for preparing chemical compounds which comprises: reacting N-benzyl-3-($R^2$)-4-($R^1$)-pyridinium halide with (p-Y-benzyl) magnesium halide in a Grignard reaction to produce N-benzyl-2-(p-Y-benzyl)-3-($R^2$)-4-($R^1$)-1,2-dihydropyridine; reducing this dihydropyridine with sodium borohydride in aqueous alcoholic solution to produce N-benzyl-2-(p-Y-benzyl)-3-($R^2$)-4-($R^1$)-1,2,5,6-tetrahydropyridine; cyclizing this tetrahydropyridine by heating it with a strong mineral acid, or equivalently with aluminum chloride or other strong Lewis acid, to yield 1,2,3,4,5,6-hexahydro-3-benzyl-6-($R^1$)-11-($R^2$)-8-(Z)-2,6-methano-3-benzazocine; and N-debenzylating this cyclization product by catalytic hydrogenolysis to yield 1,2,3,4,5,6-hexahydro-6-($R^1$)-11-($R^2$)-8-(Z)- 2,6-methano-3-benzazocine, wherein $R^1$ and $R^2$ are each lower alkyl, Y is hydrogen or lower alkoxy, and Z is hydrogen when Y is hydrogen, and Z is hydroxy when Y is lower alkoxy.

In a particularly preferred procedure for carrying out the above process of this invention, the intermediate N-benzyl-2-(p-Y-benzyl)-3-($R^2$)-4-($R^1$)-1,2,5,6-tetrahydropyridine produced by the sodium borohydride reduction step is treated with oxalic acid to form N-benzyl-2-(p-Y-benzyl)-3-($R^2$)-4-($R^1$)-1,2,5,6,-tetrahydropyridine oxalate, which is a crystalline acid-addition salt; and then this salt is isolated and is converted to the free base form by treatment with strong alkali or, advantageously, the oxalate is used as such in place of the free base form in the cyclization step of the process.

The invention sought to be patented, in a composition aspect, resides in the novel chemical compounds designated as 1,2,3,4,5,6-hexahydro-3-benzyl-6-($R^1$)-11-($R^2$)-8-(Z)-2,6-methano-3-benzazocines, wherein $R^1$, $R^2$, and Z have the same significance indicated hereinabove, obtained as an intermediate in the process of this invention.

$R^1$ and $R^2$ are the same or different alkyls, and there are included both straight and branched chain alkyls, preferably containing one to four carbon atoms, for example methyl, ethyl, isopropyl, n-butyl, and the like. When Y is lower alkoxy, there are included both straight and branched chain alkyls, preferably containing one to four carbon atoms, for example methoxy, ethoxy, n-propoxy, isobutoxy, and the like.

The halide in the N-benzyl-3-($R^2$)-4-($R^1$)-pyridinium halide and (p-Y-benzyl)magnesium halide reactants is ordinarily chloride, bromide, or iodide, the preferred halide being iodide in the former and chloride in the latter.

The 1,2,3,4,5,6-hexahydro-6-($R^1$)-11-($R^2$)-8-(Z)-2,6-methano-3-benzazocines produced by the process of this invention are chemical intermediates known to be useful for conversion to N-substituted derivatives thereof having utility as pharmaceutical agents, for instance as analgesics and as antagonists of strong analgesic agents, such as morphine and meperidine. The conventional method for obtaining these chemical intermediates involves preparing 1,2,3,4,5,6-hexahydro-3-methyl-6-($R^1$)-11-($R^2$)-8-(Z)-2,6-methano-3-benzazocine and then N-demethylating it. Thus, (benzyl or p-methoxybenzyl)magnesium halide is reacted with N-methyl-3-($R^2$)-4-($R^1$)pyridinium halide to yield N-methyl-2-(benzyl or p-methoxybenzyl)-3-($R^2$)-4-($R^1$)-1,2-dihydropyridine which is then reduced to yield N-methyl-2-(benzyl or p-methoxybenzyl)-3-($R^2$)-4($R^1$)-1,2,5,6,-tetrahydropyridine, the latter is cyclized by heating with a strong mineral acid (or equivalently with aluminum chloride or other strong Lewis acid) to produce 1,2,3,4,5,6-hexahydro-3-methyl-6-($R^1$)-11-($R^2$)-8-(Z)-2,6-methano-3-benzazocine, and removing the N- (or 3-) methyl group by treatment with cyanogen bromide (after first O-acetylating if Z is hydroxy) to form the N-cyano derivative which is then hydrolyzed to yield the desired N-desmethyl (i.e. N-H) compound, 1,2,3,4,5,6-hexahydro-6-($R^1$)-11-($R^2$)-8-(Z)-2,6-methano-3-benzazocine, wherein $R^1$, $R^2$, Y, and Z all have the same meanings indicated hereinabove. A disadvantage of this prior art process is that the N-demethylation gives relatively poor yields. On the other hand, the new process of the instant invention gives relatively high yields of product of excellent quality.

The initial step of the new process of this invention involves reaction between N-benzyl-3-($R^2$)-4-($R^1$)-pyridinium halide and (p-Y-benzyl)magnesium halide, under typical Grignard reaction conditions, and isolation of the product in conventional fashion.

The N-benzyl-2-(p-Y-benzyl)-3-($R^2$)-4-($R^1$)-1,2-dihydropyridine resulting from the Grignard reaction is then reduced to the corresponding 1,2,5,6-tetrahydropyridine. This reduction is conveniently effected using an aqueous alcoholic solution of sodium borohydride. We have discovered an especially advantageous means for effecting isolation and purification of the reduction product, i.e. N-benzyl-2-(p-Y-benzyl)-3-($R^2$)-4-($R^1$)-1,2,5,6-tetrahydropyridine. Thus, to a solution of the crude tetrapyridine in a suitable solvent, for instance acetone, there is added sufficient oxalic acid to convert the base to its oxalate salt. This crystalline salt is readily isolated in excellent yield and at the same time there is an unusually clean and efficient separation of the desired N-benzyl-2-(p-Y-benzyl)-3-($R^2$)-4-($R^1$)-1,2,5,6-tetrahydropyridine species of intermediate from undesired by-products arising in the Grignard and reduction reactions. Although the oxalate thus obtained can be readily converted to the purified free base form, this is not necessary; instead, it is ordinarily preferred to use the oxalate as such in the cyclization reaction.

The N-benzyl-2-(p-Y-benzyl)-3-($R^2$)-4-($R^1$)-1,2,5,6-tetrahydropyridine is cyclized by heating it with a strong mineral acid, for example 85 percent phosphoric acid or, preferably, concentrated hydrobromic acid, or if desired, with a strong Lewis acid, to yield 1,2,3,4,5,6-hexahydro-3-benzyl-6-($R^1$)-11-($R^2$)-8-(Z)-2,6-methano-3-benzazocine. When Y is lower alkoxy, this group is converted to hydroxy by dealkylation along with the cyclization reaction.

Finally, the 3-(or N-) benzyl cyclization product is N-debenzylated by catalytic hydrogenolysis in the presence of a noble metal catalyst such as palladium to yield the desired 1,2,3,4,5,6-hexahydro-6-($R^1$)-11-($R^2$)-8-(Z)-2,6-methano-3-benzazocine.

This invention is illustrated by the following examples without, however, being limited thereto.

EXAMPLE 1

A. A mixture of 30 g. of sodium iodide and 120 ml. of acetone is stirred until solution is complete. To this mixture there is added 25.3 g. of benzyl chloride in one portion, and stirring is continued for 1½ hours. The reaction mixture is filtered to remove sodium chloride. The slightly cloudy acetone solution is filtered through diatomaceous silica and to the filtrate thus obtained there is added 21.4 g. of 3,4-dimethylpyridine. The resulting mixture is allowed to stand overnight at room temperature and then the precipitate which has formed is collected on a filter and washed with a small amount of acetone. There is thus obtained 60.5 g. of N-benzyl-3,4-dimethylpyridinium iodide, m.p. 145°–147° C. A second crop of this product, m.p. 137°–140° C., weighing 3.7 g. is obtained from the filtrate.

A 3-neck flask is flushed with nitrogen and is then charged with 11.0 g. of magnesium turnings, 11.0 g. of magnesium powder, and 60 ml. of anhydrous diethyl ether. A crystal of iodine and 0.5 g. of p-methoxybenzyl chloride are added to the mixture, which is then heated at reflux temperature under anhydrous conditions until the reaction starts. Heating is stopped, and a solution of 35.8 g. of p-methoxybenzyl chloride in 0.6 liter of anhydrous diethyl ether is gradually added to the reaction mixture at such rate as to maintain gentle refluxing of the mixture. The reaction mixture is stirred and refluxed for 1½ hours and is then filtered to remove excess magnesium. To the filtrate there is added portionwise 45.7 g. of N-benzyl-3,4-dimethylpyridinium iodide. A cream-orange, gummy semi-solid immediately separates from solution. The mixture is stirred and refluxed for 1½ hours, during which time the gummy material changes to an almost colorless oil. This reaction mixture after standing overnight at room temperature, is mixed with a solution of 14.0 g. of ammonium chloride in 200 ml. of water. After stirring the mixture for one-half hour, the gummy material which separates initially becomes a pale yellow solid. This solid is removed by filtration. The ethereal layer in the filtrate is separated from the aqueous layer and is washed with water, and then the ether is removed under reduced pressure to yield an oil residue which weighs 57.5 g. This product is N-benzyl-2-(p-methoxybenzyl)-3,4-dimethyl-1,2-dihydropyridine.

B. The 57.5 g. of N-benzyl-2-(p-methoxybenzyl)-3,4-dimethyl-1,2-dihydropyridine thus obtained is mixed with 165 ml. of methyl alcohol, and the resulting solution, in which some material remained in suspension, is stirred while adding in a fine stream a solution of 3.9 g. of sodium borohydride in 50 ml. of water. The reaction mixture is then stirred at room temperature for 19 hours. The methyl alcohol is distilled from the reaction mixture under reduced pressure, and the residual aqueous mixture is extracted with diethyl ether. The ethereal solution is separated and is extracted four times: twice with a solution of 8.0 g. of 85 percent phosphoric acid in 150 ml. of water; once with a solution of 1.5 ml. of 85 percent phosphoric acid in 100 ml. of water; and finally with 100 ml. of water. These four extracts are combined and made strongly alkaline by addition of 35 percent aqueous sodium hydroxide solution, and then extracted several times with diethyl ether. The ethereal extracts are combined, and dried over anhydrous sodium sulfate, and the ether is distilled off under reduced pressure. There is thus obtained 32.5 g. of residual oil which is crude N-benzyl- 2-(p-methoxybenzyl)-3,4-dimethyl-1,2,5,6-tetrahydropyridine.

C. The crude tetrahydropyridine base thus obtained is added to a solution of 9.1 g. of anhydrous oxalic acid in 100 ml. of acetone. A precipitate forms immediately. The mixture is cooled and filtered, and the collected solid is washed with a small volume of cold acetone and dried at 61° C. under reduced pressure. There is thus obtained 31.2 g. of N-benzyl-3,4-dimethyl-1,2,5,6-tetrahydropyridine oxalate as a white crystalline solid which melts at 153°–158° C.

D. A mixture of 53.8 g. of N-benzyl-2-(p-methoxybenzyl)-3,4-dimethyl-1,2,5,6-tetrahydropyridine oxalate, 144 ml. of glacial acetic acid, and 285 ml. of 62 percent hydrobromic acid is refluxed for 22 hours. The reaction mixture is then concentrated under reduced pressure, yielding a red-brown residual gum. 800 ml. of isopropyl alcohol is added, and the resulting mixture is heated and stirred to break up the gummy residue. This forms an incomplete solution having a considerable amount of pink solid remaining undissolved. The mixture is concentrated under reduced pressure to a volume of approximately 250 ml. The concentrated mixture is cooled for 1 hour and then filtered to collect a pink precipitate. The solid thus collected is washed with a small volume of cold isopropyl alcohol and dried at 65° C. under reduced pressure. This product, which weighs 358 g. and melts at 130°–250° C., is dissolved in 450 ml. of boiling anhydrous ethyl alcohol. The alcoholic solution is cooled slightly and diluted with 550 ml. of anhydrous diethyl ether and cooled in a refrigerator overnight. The solid which precipitates is collected on a filter and dried at 65° C. under reduced pressure. There is thus obtained 23.7 g. of 1,2,3,4,5,6-hexahydro- 3-benzyl-6,11-dimethyl-8-hydroxy-2,6-methano-3-benzazocine hydrobromide as a pale pink solid which melts at 259°–262° C.

E. A solution of 11.8 g. of 1,2,3,4,5,6-hexahydro-3-benzyl-6,11-dimethyl-8-hydroxy-2,6-methano-3-benzazocine hydrobromide in 150 ml. of dimethylformamide is catalytically N-debenzylated using hydrogen at a pressure of 800 pounds per square inch at 50°–55° C. in the presence of 0.3 g. of 10 percent palladium-on-charcoal catalyst. The hydrogenolysis is complete in 3 hours, the theoretical amount of hydrogen being absorbed. The catalyst is removed by filtration, and the filtrate is concentrated by evaporation under reduced pressure to a volume of approximately 60 ml., cooled, diluted with approximately 150 ml. of concentrated ammonium hydroxide, and again cooled. The solid which precipitates is collected on a filter, washed with water, and dried at 65° C. under reduced pressure. There is thus obtained 6 g. of 1,2,3,4,5,6-hexahydro-6,11-dimethyl-8-hydroxy-2,6-methano-3-benzazocine as a pale green solid which melts at 234°–235° C.

EXAMPLE 2

Proceeding in a manner similar to that described in Example 1 above, but using N-benzyl-3-methyl-4-ethylpyridine in place of N-benzyl-3,4-dimethylpyridine, there is first obtained N-benzyl-3-methyl-eq-ethylpyridinium iodide, m.p. 130°–133° C. When 30.5 g. of this product is interacted with the Grignard reagent prepared from 24.8 g. of p-methoxy-benzyl chloride in 64 ml. of anhydrous diethyl ether, 6.9 g. of magnesium turnings, and 6.9 g. of magnesium powder in anhydrous diethyl ether, there is obtained 36.5 g. of N-benzyl-2-(p-methoxy-benzyl)-3-methyl-4-ethyl-1,2-dihydropyridine as an amber-colored oil. Reduction of a solution of this product in 105 ml. of methyl alcohol with a solution of 2.5 g. of sodium borohydride in 12.5 ml. of water yields 16.4 g. of N-benzyl-2-(p-methoxy-benzyl)-3-methyl-4-ethyl-1,2,5,6-tetrahydropyridine as a heavy oil. This base is interacted with 4.4 g. of anhydrous oxalic acid in 50 ml. of acetone to produce 13.3 g. of the oxalate salt of the base as nearly white crystals, m.p. 143.5°–146° C. When 115.7 g. of N-benzyl-2-(p-methoxybenzyl)-3-methyl-4-ethyl-1,2,5,6-tetrahydropyridine oxalate prepared in this manner is refluxed and stirred with 136 ml. of 62 percent hydrobromic acid and 68 ml. of glacial acetic acid for 40 hours there is obtained 69.3 g. of 1,2,3,4,5,6-hexahydro-3-benzyl-6-ethyl-11-methyl-8-hydroxy-2,6-methano-3-benzazocine hydrobromide in a first crop, m.p. 290°–293° C.; and a second crop of this product, m.p. 295°–300° C.,; weighing 14.0 g. is obtained by workup of the mother-liquor. N-debenzylation of 69.3 g. of this product, using hydrogen at a pressure of 390 pounds per square inch at 60° C., for 1 hour, yields 33.9 g. of 1,2,3,4,5,6-hexahydro-6-ethyl-11-methyl-8-hydroxy-2,6-methano-3benzazocine, m.p. 265°–269° C. A further crop of this product is recovered from the mother-liquor.

EXAMPLE 3

A. A mixture of 20.6 g. of 3,4-dimethylpyridine, 32.9 g. of benzyl bromide, and 120 ml. of isopropyl alcohol is refluxed for 3 hours to produce 51.0 g. of N-benzyl-3,4-dimethylpyridinium bromide, m.p. 202°–204° C.

A solution of 12.7 g. of benzyl chloride in 70 ml. of anhydrous diethyl ether is gradually added to 2.7 g. of magnesium turnings in 50 ml. of diethyl ether at such a rate as to maintain the refluxing of the reaction mixture. The resulting Grignard reagent is gradually poured into a well-stirred refluxing suspension of 16.7 g. of N-benzyl-3,4-dimethylpyridinium bromide in 100 ml. of diethyl ether. Steam is applied as necessary to maintain refluxing for 3 hours. The reaction mixture is poured into a well-stirred mixture of ice water containing 10 g. of ammonium chloride. The organic layer of the resulting mixture is separated and the aqueous phase is extracted, in several extractions, with a total of 40 ml. of diethyl ether. The ether extracts are combined and concentrated to an oil which weighs 18.1 g. This material is crude N,2-dibenzyl-3,4-dimethyl-1,2-dihydropyridine.

B. The crude N,2-dibenzyl-3,4-dimethyl-1,2-dihydropyridine as obtained above is dissolved in 64 ml. of anhydrous ethyl alcohol, and to this solution there is added, with stirring, a solution of 1.3 g. of sodium borohydride in 6.4 ml. of water. The reaction mixture is stirred for a total of 6 hours, without external heating or cooling, and is then allowed to stand overnight at room temperature. The alcohol is evaporated under reduced pressure and the residue is stirred with a mixture of 40 ml. of water and 50 ml. of diethyl ether. The ethereal layer is separated, and the aqueous layer is extracted with 30 ml. of diethyl ether. This extract is combined with the initial ethereal layer. The ether is evaporated to yield 16.9 g. of crude N,2-dibenzyl-3,4-dimethyl-1,2,5,6-tetrahydropyridine as an oil.

C. The crude N,2-dibenzyl-3,4-dimethyl-1,2,5,6-tetrahydropyridine obtained as described above is dissolved in 52 ml. of acetone and to this solution there is added a solution of 8.06 g. of oxalic acid dihydrate in 40 ml. of acetone. Separation of crystals from the mixture is rapid. The resulting slurry is stored overnight at 3° C. in a refrigerator. The crystalline precipitate is collected, washed with 40 ml. of cold (0° C.) acetone, and dried overnight in a vacuum oven at 60° C. There is thus obtained 13.2 g. of N,2-dibenzyl-3,4-dimethyl-1,2,5,6-tetrahydropyridine oxalate, m.p. 172°–176° C.

D. A mixture of 18 g. of N,2-dibenzyl-3,4-dimethyl-1,2,5,6-tetrahydropyridine oxalate and 114 ml. of 48 percent hydrobromic acid is gradually heated to reflux temperature. Solution is complete at 115° C. When solid begins to appear it is necessary to drop the temperature about 5° C. below reflux to prevent foaming. Heating at 112°–122° C. is continued for a total of 12 hours. After cooling the reaction mixture to 10° C. the solid therein is collected on a polypropylene filter cloth and washed with 80 ml. of cold water. The damp filter cake is slurried in 40 ml. of refluxing isopropyl alcohol. The slurry is cooled to 5° C. and filtered, and the collected solid is washed with 20 ml. of cold (5° C.) isopropyl alcohol and then dried overnight in a vacuum oven at 60° C. There is thus obtained 12.6 g. of 1,2,3,4,5,6-hexahydro-3-benzyl-6,11-dimethyl-2,6-methano-3-benzazocine hydrobromide, m.p. 285°–287° C.

E. A solution of 64.3 g. of 1,2,3,4,5,6-hexahydro-3-benzyl-6,11-dimethyl-2,6-methano-3-benzazocine hydrobromide in 600 ml. of dimethylformamide is catalytically N-debenzylated during 1 hour using hydrogen at a pressure of 40–50 pounds per square inch at 45°–70° C. in the presence of 0.65 g. of 60 per cent palladium chloride and 5.9 g. of charcoal. The catalyst is removed by filtration, using an additional 200 ml. of dimethylformamide as a wash. The solvent is evaporated from the filtrate under reduced pressure and the residual syrup thus obtained is dissolved in isopropyl alcohol, cooled, and made basic by the addition of 12.6 ml. of concentrated ammonium hydroxide. (Rather than proceed through the hemi-hydrobromide salt as described below, if the final product is desired directly in free base form, it is preferable to dissolve the residual syrup in water and make the solution basic by addition of sodium hydroxide solution rather than ammonium hydroxide.) The resulting slurry is cooled overnight at 3° C. in a refrigerator and then filtered. The crystalline solid thus collected is washed with 20 ml. of cold (3° C.) isopropyl alcohol followed by 20 ml. of pentane, and dried at 60° C. in a vacuum oven. There is thus obtained 27.9 g. of 1,2,3,4,5,6-hexahydro-6,11-dimethyl-2,6-methano-3-benzazocine hemi-hydrobromide ($C_{14}H_{19}N \cdot \frac{1}{2}$ HBr). The filtrate is concentrated to dryness, leaving a thick unstirrable mass. This is dissolved in 20 ml. of water, and the solution is made basic by adding 10 ml. of 35 percent aqueous sodium hydroxide solution, and extracted, in several extractions, with 40 ml. of diethyl ether. The ethereal extracts are dried over sodium hydroxide pellets, the solvent is removed, and the residue is fractionally distilled under reduced pressure. The fraction boiling at 126°–130° C. at 0.3–0.5 mm.Hg. has $n_d^{25°}$ C.=1.5600, Z 22.7 and weighs 12.6 g. This product is 1,2,3,4,5,6-hexahydro-6,11-dimethyl-2,6-methano-3-benzazocine.

The 1,2,3,4,5,6-hexahydro-6,11-dimethyl-2,6-methano-3-benzazocine hemi-hydrobromide (27.9 g.) obtained above is converted to the free base by treating an aqueous solution of the salt with 12 ml. of 35 percent aqueous sodium hydroxide solution. There is thus obtained another 21.3 g. of the free base, for a total yield of 33.9 g. of the free base.

We claim:
1. The process which comprises: reacting N-benzyl-3-($R^2$)-4-($R^1$)-pyridinium halide with (p-Y-benzyl)magnesium halide in a Grignard reaction to produce N-benzyl-2-(p-Y-benzyl)-3-($R^2$)-4-($R^1$)-1,2-dihydropyridine; reducing the N-benzyl-2-(p-Y-benzyl)-3-($R^2$)-4-($R^1$)-1,2-dihydropyridine with sodium borohydride in aqueous alcoholic solution to produce N-benzyl-2-(p-Y-benzyl)-3-($R^2$)-4-($R^1$)-1,2,5,6-tetrahydropyridine; isolating the latter in the form of its crystalline oxalate salt; cyclizing said oxalate salt by heating it with a strong mineral acid to yield 1,2,3,4,5,6-hexahydro-3-benzyl-6-($R^1$)-11-($R^2$)-8-(Z)-2,6methano-3-benzazocine; and N-debenzylating this cyclization product by catalytic hydrogenolysis to yield 1,2,3,4,5,6-hexahydro-6-($R^1$)-11-($R^2$)-8-(Z)-2,6-methano-3-benzazocine, wherein $R^1$ and $R^2$ are each lower alkyl, Y is hydrogen or lower alkoxy, and Z is hydrogen when Y is hydrogen and Z is hydroxy when Y is lower alkoxy.

2. The process in accordance with claim 1 wherein each of $R^1$ and $R^2$ is methyl and Y is methoxy.

3. The process in accordance with claim 1 wherein $R^1$ is ethyl, $R^2$ is methyl, and Y is methoxy.

4. The process in accordance with claim 1 wherein each of $R^1$ and $R^2$ is methyl and Y is hydrogen.

* * * * *